Nov. 27, 1923.

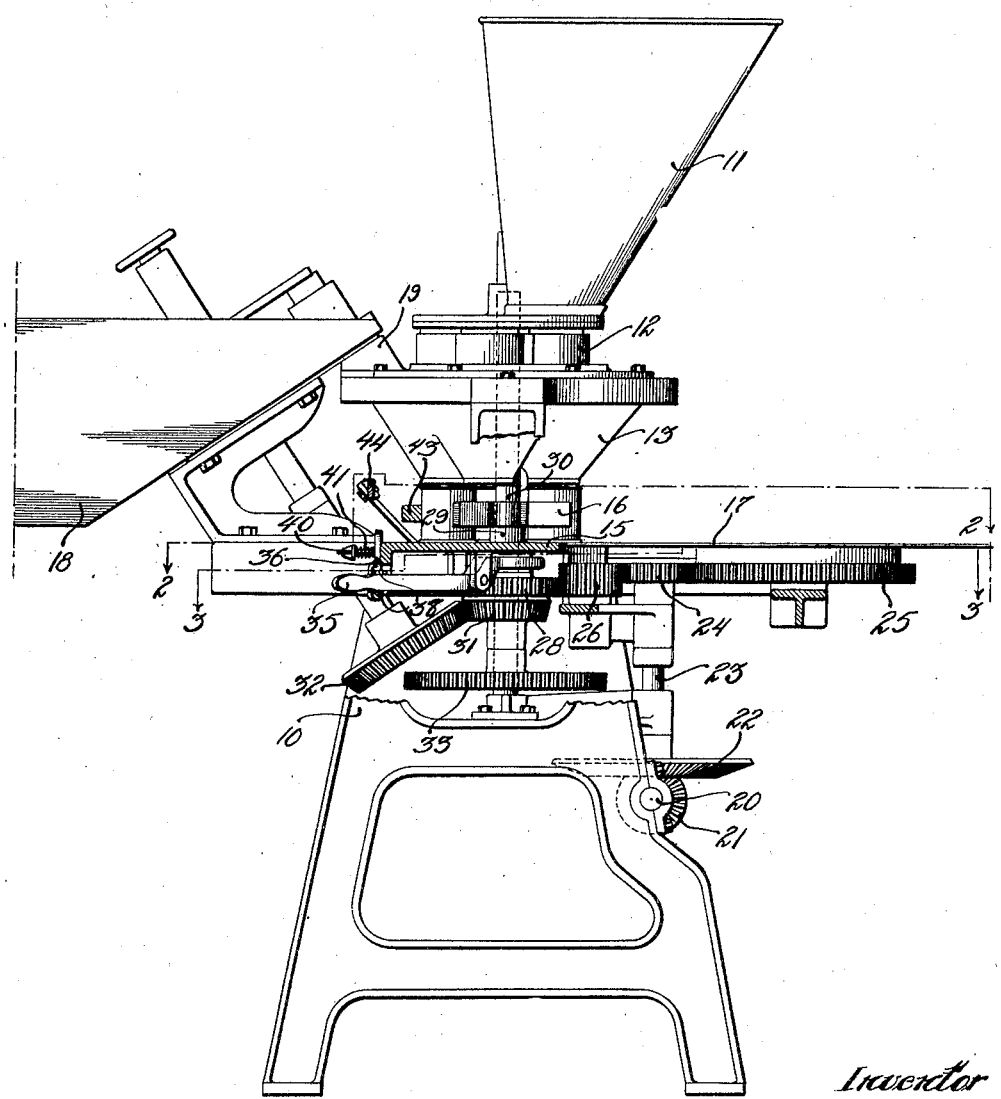

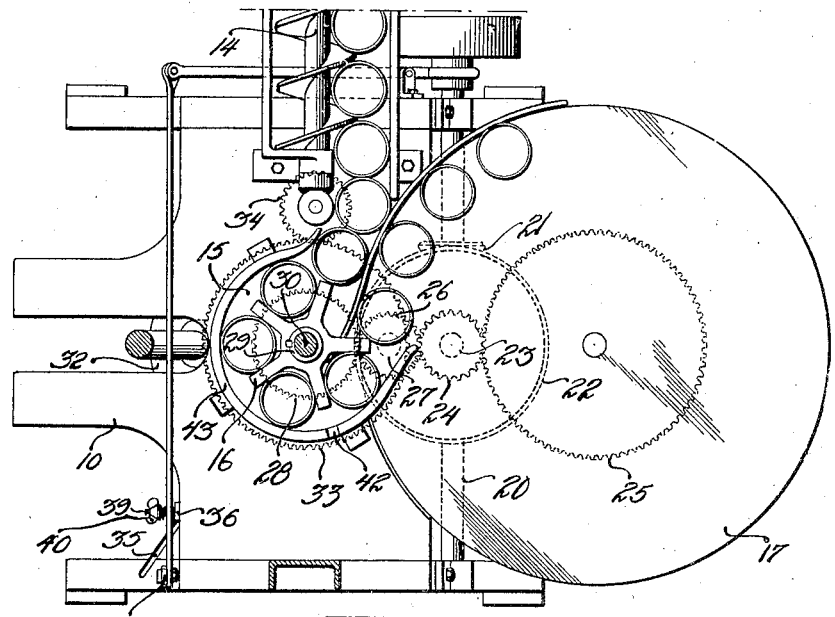
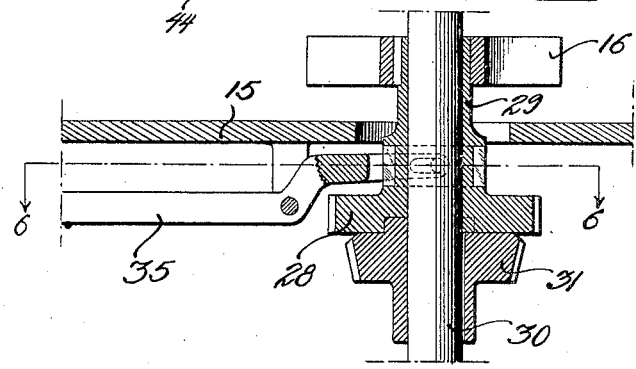

C. H. AYARS 1,475,675

CAN FILLING MACHINE

Filed April 1, 1922

Witnesses
George A. Gruss
Elizabeth Garbe

Inventor
Charles H. Ayars
By Joshua R. H. Potts
his Attorney

Nov. 27, 1923.
C. H. AYARS
1,475,675
CAN FILLING MACHINE
Filed April 1, 1922
4 Sheets—Sheet 4
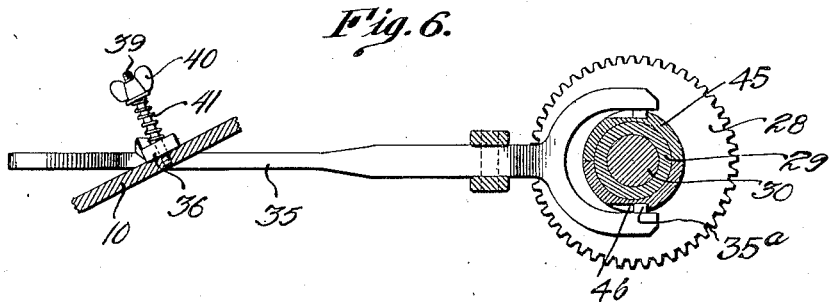
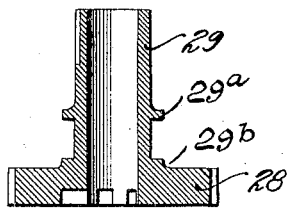
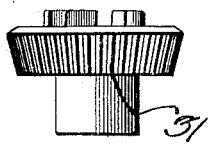
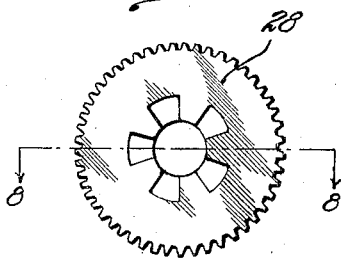
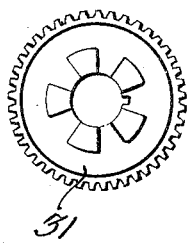
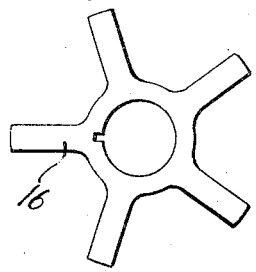
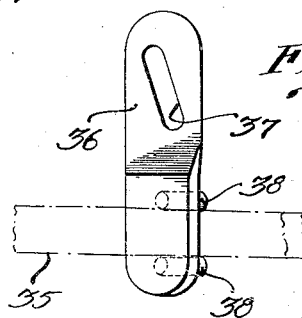
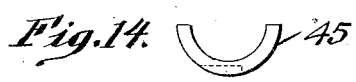
Witnesses
George A. Gruss
Elizabeth Girbe
Inventor
Charles H. Ayars
By Joshua R. H. Potts
his Attorney Patented Nov. 27, 1923.

1,475,675

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CAN-FILLING MACHINE.

Application filed April 1, 1922. Serial No. 548,562.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

My invention relates to improvements in can filling machines and more especially to stop mechanism for the feeding mechanism. In the use of can filling machines, when the kind or grade of material to be fed is changed or operation of the machine is interrupted for a time sufficient to allow the cans to cool, the cans which are under the hopper and funnels must be removed. For the purpose of such removal it is essential that the empty-can feed mechanism, the brine feed mechanism and the hopper or turret feed mechanism be stopped and, if the removal is to be mechanically accomplished, the mechanism which moves the cans from the funnels and the discharge disk must continue to function.

The object of my invention is to provide simple and efficient mechanism whereby the empty-can feed, the hopper feed and the brine feed may be stopped while the mechanism which moves the cans to and from the funnels and the delivery disk or table which receives the filled cans continue in motion.

This object I attain in the following manner, reference being had to the accompanying drawings in which Figure 1 is a side elevation, partly in section, of a machine embodying my invention, Figure 2 is a sectional plan view taken on the line 2—2 of Figure 1, illustrating how the cans are fed through the machine, Figure 3 is a sectional plan view taken on the line 3—3 of Figure 1, illustrating the gearing which forms a part of my invention, Figure 4 is a view of the same general character as that shown in Figure 2, illustrating the cans being fed out of the machine.

Figure 5 is a sectional view taken on the line 5—5 of Figure 3,

Figure 6 is a sectional view taken on the line 6—6 of Figure 5,

Figure 7 is a face view of a gear which forms a part of my invention,

Figure 8 is a section taken on the line 8—8 of Figure 7,

Figure 9 is a side view of another gear which forms a part of my invention,

Figure 10 is a top plan view of Figure 9,

Figure 11 is a side view of a star wheel,

Figure 12 is a top plan view of Figure 11,

Figures 13 and 14 are respectively side and top views of a split collar used in attaching a clutch lever, and Figure 15 is an elevational view of a bracket forming part of the lever locking mechanism.

Figure 4:
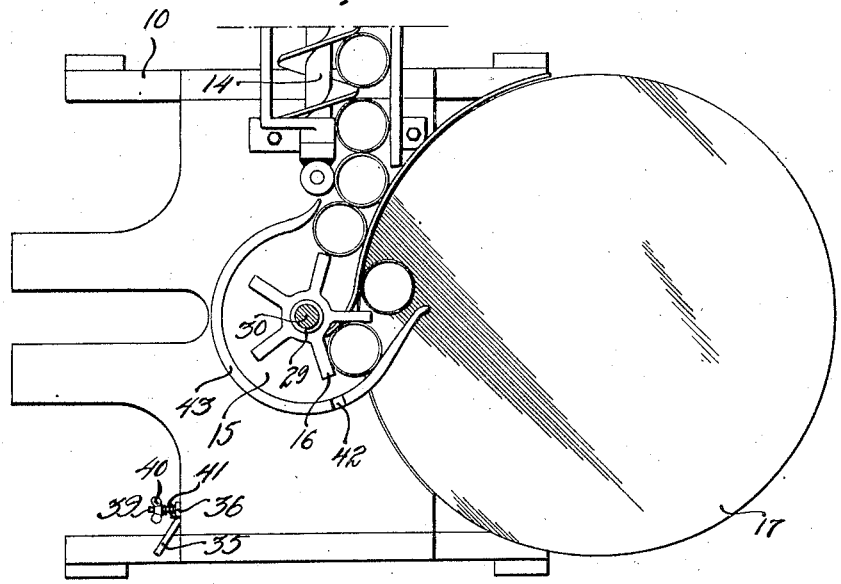

I have shown and described my invention as applied to can filling machines of the type disclosed by my copending application Serial No. 382,368, filed May 18, 1920.

In the drawings, 10 represents the frame or supporting structure of the machine, 11 the hopper, 12 the measuring wheel, 13 the distributing wheel, 14 the can feeding mechanism, 15 the plate upon which the cans are deposited as they are fed, 16 the wheel, shown as a star wheel, by which the cans are carried under the funnels, 17 the rotatable table which receives the filled cans, 18 the liquid or brine tank and 19 the discharge tube of the tank leading to the distributing wheel 13. These parts may be of any usual or preferred construction.

Figure 3:
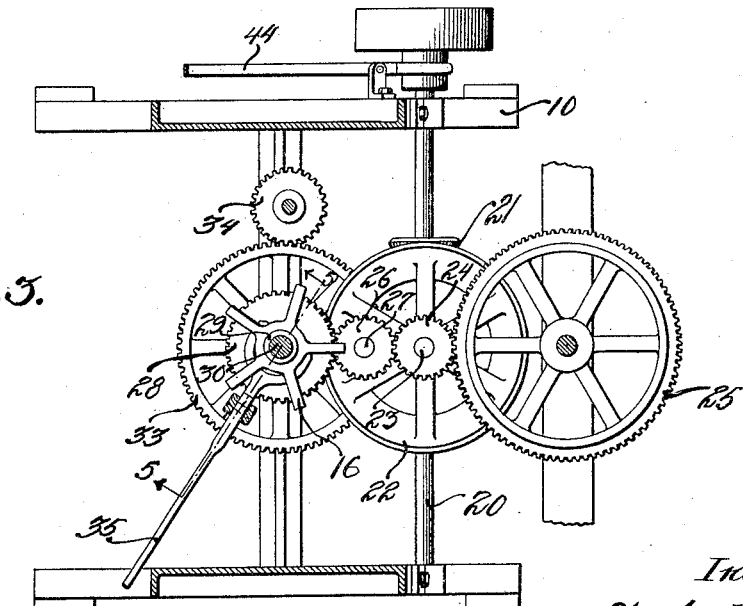

The driving shaft 20 carries a bevel wheel 21 adapted to engage with a bevel wheel 22 fixed to the lower end of a vertical shaft 23 which carries at its upper end a pinion 24 which meshes with a gear 25, adapted to actuate the discharge disk 17, and also with a wide faced gear 26 carried by a stud 27. The wide faced gear meshes with a clutch faced gear 28 carried by a sleeve 29 on a second vertical shaft 30. The clutch face of gear 28 engages, when can filling is proceeding, with the clutch face of a bevel gear 31 keyed to shaft 30 and meshing with another bevel gear 32 which drives the brine feed mechanism. The star wheel 16 is keyed to sleeve 29 and rotates therewith. A gear 33 is keyed to shaft 30 and meshes with a gear 34 fixed to a vertical shaft which is operatively connected with the worm shaft 14 which constitutes the can feeding mechanism (see Figures 1, 2, and 3). A grade changing lever 35 is suitably connected with sleeve 29 in such manner that by pressing the free end of the lever downward the sleeve may be lifted and the clutch face on gear 28 freed from engagement with the clutch face on gear 31, and by raising the lever the clutch may be reengaged. Sleeve 29 is provided with a circumferential flange 29ª and with shoulders 29ᵇ forming a groove adapted to receive a split collar 45, each member having a slot 46 adapted to receive lugs 35ª carried by the prongs of lever 35. When the sleeve 29 is lifted so that the clutch is disengaged gear 28 remains in mesh with the wide faced gear 26. The measuring wheel, the distributing wheel, the gear which drives the brine feed mechanism and the gear which drives the can feeding mechanism are fixed to the feed shaft 30 which, when the clutch mechanism is engaged, is driven by the bevel gear 31. When the clutch members are disengaged the sleeve 29 and the star wheel carried thereby will be rotated by the action of the wide faced gear 26 but the feed shaft 30 and the parts fixed thereto will be stationary. With the driving shaft 20 in action the star wheel will then be actuated from shaft 23 through pinion 24, wide faced gear 26 and gear 28 and the discharge disk will be actuated from the same shaft through pinion 24 and gear 25.

For locking the grade changing lever in either position any suitable means may be employed. I have illustrated it locked as follows:—A bracket 36, provided with a slot 37 and pins or lugs 38, is held in engagement with a convenient part of the frame by means of a pin 39 threaded at both ends, the pin taking through slot 37 and into the frame. The free end of the pin carries an adjusting nut 40 and a spring 41 is interposed between the adjusting nut and the bracket. The lever is held between the pins 38. When the lever is moved downwardly it draws the bracket downwardly and when it is moved upwardly it pushes the bracket upwardly and the latter is held in either position by the frictional engagement of the bracket with the frame.

When the grade is to be changed there will be danger of crushing a can unless the can last fed is in proper position to be engaged by an arm of the star wheel. In order to readily ascertain whether the arms and the cans are in the proper position I place an indicating mark 42 upon the guide arm 43. When any spoke of the star wheel is in alignment with this indicator the can will be in the proper position. Preferably operation of the machine is then stopped by actuating the main stop lever 44. The operator can then make sure of the conditions, move the grade changing lever to throw the clutch on shaft 30 out of engagement and then start the machine by means of the main clutch lever.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a can filling machine, a shaft adapted to actuate feed mechanism; a gear fixed to the shaft; a sleeve on the shaft carrying can positioning mechanism; a gear on the sleeve adapted to be engaged with or disengaged from the gear fixed to the shaft; means for engaging or disengaging the gears, and means for driving the sleeve gear whether engaged or disengaged.

2. In a can filling machine, a shaft adapted to actuate feed mechanism; a gear fixed to the shaft; a sleeve on the shaft carrying can positioning mechanism; a gear on the sleeve adapted to be engaged with or disengaged from the gear fixed to the shaft; means for engaging or disengaging the gears, and a wide faced gear adapted to actuate the sleeve gear whether engaged or disengaged.

3. In a can filling machine, a shaft adapted to actuate feeding mechanism; a clutch faced gear on the shaft; a sleeve on the shaft carrying can-positioning mechanism; a clutch faced gear on the sleeve, adapted to engage the gear on the shaft; means for engaging or disengaging the gears and a wide faced gear adapted to actuate the sleeve gear whether engaged or disengaged.

4. In a can filling machine, a shaft adapted to actuate can discharging mechanism; a shaft adapted to actuate feed mechanism; a gear fixed to the feed shaft; a sleeve on the feed shaft carrying can positioning mechanism; a gear on the sleeve adapted for engagement with the gear on the feed shaft; means for engaging or disengaging the gears, and gearing between the first named shaft and the sleeve gear whereby the latter may be driven whether engaged or disengaged.

5. In a can filling machine, a shaft adapted to actuate can discharging mechanism; a shaft adapted to actuate feed mechanism; a gear fixed to the feed shaft; a sleeve on the feed shaft carrying can positioning mechanism; a gear on the sleeve adapted for engagement with the gear on the feed shaft; means for engaging or disengaging the gears, and gearing, including a wide faced gear, between the first named shaft and the sleeve gear whereby the latter may be driven whether engaged or disengaged.

6. In a can filling machine, a shaft adapted to actuate can discharging mechanism; a shaft adapted to actuate feed mechanism; a clutch faced gear on the feed shaft; a sleeve on the feed shaft carrying can positioning mechanism; a clutch faced gear on the sleeve adapted for engagement with the clutch faced gear on the feed shaft; means for engaging or disengaging the clutch, and a wide faced gear, driven from the first named shaft, adapted to drive the sleeve whether engaged or disengaged.

In testimony whereof I have signed my name to this specification in the presence of two subscribing witnesses.

CHARLES H. AYARS.

Witnesses:
GEORGE B. PARKINSON,
CHAS. E. POTTS.